United States Patent

Kvant et al.

[11] Patent Number: 5,904,856
[45] Date of Patent: *May 18, 1999

[54] PROCESS FOR THE PREPARATION OF ALUMINUM SALT SOLUTIONS

[75] Inventors: Magnus Kvant, Niederroedern, France; Roger Barstrom, Ödåkra, Sweden

[73] Assignee: Kemira Kemi Aktiebolag, Helsingborg, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/590,627

[22] Filed: Jan. 24, 1996

[30] Foreign Application Priority Data

Jan. 24, 1995 [SE] Sweden .................................. 9500264

[51] Int. Cl.$^6$ ........................................................ C02F 1/52
[52] U.S. Cl. .......................... 210/716; 210/723; 423/131; 423/132
[58] Field of Search ..................................... 423/518, 600, 423/DIG. 1, 115, 116, 117, 131, 132; 210/716, 723

[56] References Cited

U.S. PATENT DOCUMENTS

| 3,300,277 | 1/1967 | Schenck | 423/600 |
|---|---|---|---|
| 3,418,087 | 12/1968 | Schenck | 423/518 |
| 4,639,362 | 1/1987 | Schanz | 423/600 |
| 4,681,697 | 7/1987 | Doetsch et al. | 210/716 |
| 5,032,369 | 7/1991 | Kondo et al. | 423/DIG. 1 |

FOREIGN PATENT DOCUMENTS

| 0554562 | 8/1993 | European Pat. Off. . | |
|---|---|---|---|
| 1417530 | 12/1970 | Germany | 210/716 |
| 63-218292 | 9/1988 | Japan | 210/716 |
| 916401 | 3/1982 | Russian Federation | 423/600 |
| 1520109 | 8/1978 | United Kingdom . | |

OTHER PUBLICATIONS

Database WPI, Section Ch, Week 7624, Derwent Publications Limited, Record XP002000519 (Abstract of JP-A-49111892) (Oct. 24, 1974).

Database WPI, Section Ch, Week 7242, Derwent Publications Limited, Record XP002000520 (Abstract of JP-B-47040628) (Sep. 28, 1970).

Database WPI, Section Ch, Week 7938, Derwent Publications Limited, Record XP002000521 (Abstract of JP-A-54100998) (Aug. 9, 1979).

Primary Examiner—Wayne Langel
Attorney, Agent, or Firm—Baker & Botts, L.L.P.

[57] ABSTRACT

The present invention relates to a process for the preparation of solutions of aluminum salts, characterized in that an aluminate of an alkali metal and/or alkaline earth metal is dissolved in an acid solution to the formation of a solution which is used as such or is diluted to a suitable concentration.

10 Claims, No Drawings

PROCESS FOR THE PREPARATION OF ALUMINUM SALT SOLUTIONS

DESCRIPTION

TECHNICAL FIELD

The present invention relates to a process for the manufacture of aluminum salt solutions.

The object of the present invention is to obtain a rational and cost efficient process for the manufacture of solutions of aluminum salts, such as of aluminum chloride, aluminum sulphate and mixed salts.

BACKGROUND OF THE INVENTION

At purification of water different types of aqueous solutions of metal salts, such as aluminum sulphate, aluminum chloride, ferri chloride, and the similar are used. The basic polysalts of aluminum chloride and aluminum sulphate or mixed aluminum-ferri chloride are in this case particularly effective and of interest. Common to all processes for the manufacture of such solutions are that they all require high temperatures and concentrated acids in order to have the dissolution and reaction with the minerals, which are the source of the metal salts, to run with a reasonable speed. Due to these process parameters all equipment has to be made of corrosion resistant materials, as well as the equipment materials shall all be able to resist high pressures in those cases an elevated pressure is used to speed up the process.

Further the process capacity of the plants is limited due to the fact that the reaction time is long, two hours being the shortest time, and is hereby due for the more simple products, such as aluminum sulphate and aluminnum chloride. More advanced products, such as the basic salt solutions require a longer time and e.g., polyaluminum chloride-sulphate requires 6 hrs at 160° C. to be produced.

There is thus a well grounded demand for obtaining better processes which can increase and cost-reduce the production of such aluminum and ferri salt solutions, in particular since the world community today requires increased water purification of economically weak nations and communities as well.

DESCRIPTION OF THE PRESENT INVENTION

It has now surprisingly been shown possible to meet this demand by means of the present invention which is characterized in that a aluminate of an alkali metal and/or alkaline earth metal is dissolved in an acid solution to the formation of a solution which is used as such or is diluted to a suitable concentration.

By means of the present invention it is obtained that the demand for concentrated acids, high temperatures and sophisticated process equipment is eliminated.

As starting material for the present process solid alkali aluminates, such as portland cement like minerals of the type CIMENT FONDU, calcium-aluminum-iron-titanium-silicate cement, can be used. These cement types having high aluminum contents are commercially available and the production thereof is well known. See for example The Chemistry of Cement and Concrete by F. M. Lea, E. Arnold (Publishers) Ltd. 3rd ed. pp 490–527. These cements contain typically 30 to 75% of $Al_2O_3$. They are produced by heating aluminum containing minerals, such as bauxite and aluminum hydroxide with calcium carbonate, whereby carbon dioxide is released and the cement is formed. This is then ground to a fine powder for further use. These types of cement are usually used for applications which shall resist high temperatures.

It has now turned out that these cements dissolve immediately in diluted acids, such as 10–15% hydrochloric acid in an extremely short time, and that the compounds obtained have the same properties as those prepared in a conventional way. Thus a cement fondu comprising 40% $Al_2O_3$ dissolves in 15% hydrochloric acid within 5 minutes without any addition of heat and at atmospheric pressure, whereby a mixed polyaluminum chloride, a so called PAX, having 75% basicity is obtained. Furthermore, the product showed improved properties in flocculating tests, which properties were superior to the properties of conventionally produced products of polyaluminum chloride having the same basicity.

Solid aluminates, such as cement fondu or sintered aluminates can be produced using different starting alkali metals or alkaline earth metals, such as calcium, magnesium, and sodium. The aluminates can be produced by sintering or melting a mixture of aluminum hydroxide and suitable salts of calcium, magnesium and sodium. Hereby the oxides or carbonates are preferably used. Other methods for the production of alkali aluminates are known, as well.

The present invention is not restricted to the use of ciment fondu, but other solid aluminates produced in a different way can be used in the same way.

EXAMPLE 1

A calcium aluminate cement obtained from LaFarge Fondu International, 157, Av. Charles de Gaulle, F-92521 Neuilly-sur-Seine, France was used for dissolution. The cement had a typical composition as follows:

$Al_2O_3$ 50%
CaO 40%
$Fe_3O_4$ 17%

25 grammes of this cement was mixed with 100 g of 16% hydrochloric acid having a temperature of 10° C. After about 5 min. the reaction had ceased. The solution now contained a polyaluminum-ferri chloride having
4.95% Al
1.7% Fe
Basicity 65%.

EXAMPLE 2

For the preparation of a calcium aluminate, alumium hydroxide was mixed with calcium oxide or calcium carbonate in a molar ratio of 0.30 to 2.0:1 of calcium:aluminum, whereupon sintering was carried out at 1,000 to 1400° C. for 0.5 to 2.5 hrs. Sintering can be carried out at a temperature of 700 to 1,900° C., whereby the time for completing the sintering is changed correspondingly.

Dissolution of sintered aluminate 10 g of calcium aluminate having a mol ratio Ca:Al of 1.0:1 were mixed with 37 g of 37% hydrochloric acid whereby a complete dissolution was obtained within 5 min. The dissolution provided a polyaluminum solution having an Al content of 5.5% and a molar ratio OH/Al=1.5, i.e. a basicity of 50%.

10 g of calcium aluminate having the molar ratio Ca:Al 0.5:1 were mixed with 38 g of 37% hydrochloric acid, which provided a polyaluminum solution having an Al content of 6.3 and a molar ratio OH/Al=1.19, i.e. a basicity of 40%.

EXAMPLE 3

Calcium and magnesium aluminates, respectively can be produced in different ways. Thereby one can add aluminum hydroxide and a salt of calcium or magnesium to sodium hydroxide, whereupon the mixture is boiled for 1 to 6 hrs. The aluminate formed precipitates and is filtered off. Alternatively, a calcium salt or magnesium salt can be added to a hot or cold sodium aluminate solution whereby an aluminate of calcium or magnesium precipitates which can be filtered off. In both cases there is an excess of aluminum present in the solution.

Dissolution of aluminate produced according to a wet method 10 g of calcium aluminate having a molar ratio Ca:Al=1.5 were dissolved in 25 g of 37% hydrochloric acid which provided a polyaluminum solution having an aluminum content of 4.4% and a molar ratio OH/Al=1.6, i.e. a basicity of 53%.

For the dissolution of solid aluminates different inorganic acids can be used, such as HCl, $HNO_3$, $H_2SO_4$, in order to provide different coagulants, i.e. flocculating agents for the purification of e.g. sewage water. But also an aluminum chloride solution, which is acidic, can be used for the preparation of the aluminum solutions from the aluminate, whereby it is obtained that the aluminum content and the basicity can be further increased. The efficiency of a coagulant is dependent of the basicity of the solution. The desire to reach high contents of aluminum is mostly dependent on transport economical reasons.

By means of the present invention acids having lower concentrations than usual can be used, which is of importance as such acids are considerably more safer to handle, produce considerably smaller impact on the environment at the dissolution and furthermore they have a much lower price. Thus residual acids from the pickling of metal objects can be used. Hereby such acids very often contains iron and aluminum which means that these residual products can be reclaimed. Today such acids are commercially completely unprofitable and be obtained for a small cost as no use for these acids is at hand and as they are a waste problem for the industry. At the precipitation of impurities at the purification of water solutions having a concentration of 1 to 2% of Al are used.

We claim:

1. A process for purifying water comprising the steps of forming a solution consisting essentially of an aluminate and an acid, wherein the aluminate is selected from the group consisting of calcium aluminate and magnesium aluminate and the acid is selected from the group consisting of an inorganic acid, including residual acids, and aluminum chloride; and subsequently treating impure water with the solution.

2. The process of claim 1 wherein the aluminate is comprised in a cement.

3. The process of claim 1 wherein the aluminate has a ratio of alkali/Al greater than 0.3.

4. The process of claim 1 wherein the aluminate is prepared according to a wet process.

5. The process of claim 1 wherein the acid is an inorganic acid.

6. The process of claim 1 wherein the acid is a residual acid.

7. The process of claim 1 wherein the acid is at least 10% HCl.

8. The process of claim 1 wherein the acid is an acidic solution of aluminum salt.

9. The process of claim 1 wherein the solution is formed without the addition of heat.

10. The process of claim 1 wherein the solution is formed at atmospheric pressure.

* * * * *